United States Patent [19]
Carlsten et al.

[11] Patent Number: 5,770,168
[45] Date of Patent: Jun. 23, 1998

[54] OZONE-GENERATOR SELF ADJUSTING PUSH-PULL CIRCUIT

[75] Inventors: Ronald J. Carlsten; Victor J. Hamel, both of Tucson, Ariz.

[73] Assignee: Val Priotte, Tucson, Ariz.

[21] Appl. No.: 503,647

[22] Filed: Jul. 18, 1995

[51] Int. Cl.⁶ .............................. B01J 19/08; C01B 13/11
[52] U.S. Cl. ........................................................ 422/186.16
[58] Field of Search ........................ 422/186.07, 186.08, 422/186.09, 186.1, 186.11, 186.12, 186.13, 186.14, 186.15, 186.16, 186.18, 186.19, 186.2

[56] References Cited

U.S. PATENT DOCUMENTS

| | | |
|---|---|---|
| 3,130,570 | 4/1964 | Rentzepis . |
| 3,194,628 | 7/1965 | Cannon . |
| 3,899,684 | 8/1975 | Tenney . |
| 4,002,921 | 1/1977 | Lowther . |
| 4,049,552 | 9/1977 | Arff . |
| 4,430,306 | 2/1984 | Namba . |
| 4,517,159 | 5/1985 | Karlson . |
| 4,898,679 | 2/1990 | Siegel . |
| 4,988,484 | 1/1991 | Karlson . |
| 5,004,587 | 4/1991 | Tacchi . |
| 5,051,137 | 9/1991 | Nold . |
| 5,069,880 | 12/1991 | Karlson . |
| 5,082,558 | 1/1992 | Burris . |
| 5,087,419 | 2/1992 | Lutz . |
| 5,106,589 | 4/1992 | Conrad . |
| 5,120,512 | 6/1992 | Masuda . |
| 5,137,697 | 8/1992 | Lathan . |
| 5,173,268 | 12/1992 | Weaver . |
| 5,268,151 | 12/1993 | Reed et al. .......................... 422/186.16 |
| 5,269,893 | 12/1993 | Conrad . |
| 5,285,372 | 2/1994 | Huynh et al. ........................... 363/132 |
| 5,354,541 | 10/1994 | Sali . |
| 5,366,702 | 11/1994 | Rimpler ............................. 422/186.07 |
| 5,443,800 | 8/1995 | Dunder ............................... 422/186.16 |
| 5,474,750 | 12/1995 | Racca et al. ........................ 422/186.15 |

*Primary Examiner*—Charles T. Jordan
*Assistant Examiner*—John R. Hardee
*Attorney, Agent, or Firm*—Mark L. Ogram

[57] ABSTRACT

An ozone producing machine that produces ozone by ionizing oxygen in the input gas with a high voltage arc. The present invention includes an electronic circuit that is used to drive a high frequency self oscillating push-pull ozone generating cell. The ozone cell has a self resonant frequency that is determined by the construction of the ozone cell and by the characteristics of the gas (air or oxygen) being put through the cell. Ozone production by the cell is maximized when the cell is preferably driven at $\frac{2}{3}$ times the resonant frequency. The present invention detects the resonant frequency of the cell and drives the cell at $\frac{2}{3}$ times that resonant frequency. Further, the invention detects any changes in the resonant frequency of the cell and adjusts the drive to the cell to compensate for those changes, thus driving the cell at the optimum frequency for maximal ozone production.

10 Claims, 7 Drawing Sheets

| TYPE | PATTERN | VALUE | DESIGNATORS |
|---|---|---|---|
| BRIDGE | | 941 | BR1 |
| CONN 26F | | | J1 J2 |
| CONN M | | | P1 P2 P3 P4 P5 P6 P7 P8 |
| LM7805CTB | | 5V REG | U1 |
| LM7815CTB | | 15V REG | U9 |
| MOSFET N | | IRFP260 | Q3 Q4 Q5 Q6 |
| CAP100 | CAP100 | 0.1 UF | C3 C7 |
| CAP200 | CAP200 | 0.001 UF | C4 |
| | | 0.01 UF | C6 C9 |
| | | 0.1 UF | C2 |
| | | 0.22 UF | C5 |
| CAP200RP | CAP200RP | 10000 UF | C8 |
| 7404 | DIP14 | | U3 |
| 7451 | DIP14 | | U6 |
| 7474 | DIP14 | | U8 |
| 74163 | DIP16 | | U7 |
| 74221 | DIP16 | | U4 |
| LM393ANE | DIP8 | | U2 |
| LM555JA | DIP8 | | U5 |
| 1N4732 | DO-41 | | D1 D2 |
| RES | RES300 | 1.6K, 1/4W | R3 |
| | | 150, 1W | R22 R23 R24 R25 |
| | | 180, 1.0W | R2 |
| | | 1K, 1/2W | R20 R21 |
| | | 1K, 1/4W | R10 R14 R18 R19 R4 R7 R9 |
| | | 3.6K, 1/4W | R8 |
| | | 4.7K, 1/4W | R5 |
| | | 4K, 1/4W | R6 |
| | | 5.6K, 1/4W | R12 |
| | | 680, 1/4W | R13 |
| 2N2222a | TO-18 (EBC) | | Q1 Q2 |

FIG. 3

OZONE-GENERATOR SELF ADJUSTING PUSH-PULL CIRCUIT

BACKGROUND OF THE INVENTION

This invention relates generally to ozone generators and more particularly to circuits used to drive ozone generators.

Ever since ozone was first discovered in 1840 by Christian Friedrich Schonbein while experimenting with batteries, the uses for ozone as a sterilizer have grown significantly. Ozone is known to be one of the best sterilizers available yet its use has been limited by technology's ability to economically produce it.

Ozone is an extremely powerful oxidant, bleach, and water purifier and is often used to treat industrial wastes, for water purification, and for sterilization of surgical instruments.

Ozone is the second most powerful oxidant known. This means that ozone: is a powerful oxidant for pollutants and organic contaminants; and, is an excellent sterilant for microorganisms. When compared to chorine, ozone has an oxidizing potential 50% greater and can destroy bacteria and viruses up to three thousand times faster.

Most ozone generators currently use ultraviolet radiation. These are usually the lowest cost ozone generators on a per unit basis. This decrease in cost is due to the fact that the air does not go through an initial drying process.

Newer units being produced utilize a corona discharge technique which dry the air before charging the air with ozone. This drying permits the corona discharge apparatus to produce a higher ozone concentration, but at a much higher overall equipment cost.

For minimal expenditures of electrical energy, ozone normally is produced from dried air (−60 degrees fahrenheit dew point) in concentrations of one to two percent and from dry oxygen in concentrations of two to four percent. More than eighty percent of the electrical energy applied to the electric discharge field is converted to heat and, if this is not quickly removed from the cell, the heat causes rapid decomposition of the ozone back to oxygen.

The loss of energy through heat would be acceptable if the generation of ozone was sufficient; but, that has not been the case.

The generation of ozone by a high voltage micro-discharge apparatus is well known and the art is well documented. Patents in the field include: U.S. Pat. No. 4,430,306, entitled "Oxygen Recycle Type Ozonizing Apparatus" issued to Namba et al. on Feb. 7, 1984; U.S. Pat. No. 4,988,484, entitled "High Efficiency Ozone Generator for Sterilizing, Bleaching and the like", issued to Karlson on Jan. 29, 1991; U.S. Pat. No. 5,120,512, entitled "Apparatus for Sterilizing Objects to be Sterilized" issued to Masuda on Jun. 9, 1992; U.S. Pat. No. 5,069,880, entitled "Ozone Sterilizer" issued to Karlson on Dec. 3, 1991; and, U.S. Pat. No. 5,087,419, entitled "Ozone Sterilization Process Which Decontaminates Evacuated Waste with Ozone" issued to Lutz on Feb. 11, 1992.

In some of these generators, the generation of ozone uses low frequency, 60 Hz., drivers that do not adjust for changes in the cell operating characteristics and ambient conditions. These machines are very inefficient and produce a low amount of ozone for the power into the machine.

Low ozone generation efficiency has significantly limited the scope and range of applications in which ozone could be utilized.

It is clear that if the efficiency of ozone generators is increased, then the range of applications and the usefulness of ozone will be significantly increased.

SUMMARY OF THE INVENTION

This invention is a self adjusting electronic circuit that drives a high voltage transformer and ozone cell. The circuit drives the cell at a multiple of its resonant frequency such that the cell produces an optimal amount of ozone.

In operation, the ozone producing machine of this invention produces ozone by ionizing oxygen in the input gas using a high voltage micro-discharge apparatus. The electronic circuit is used to drive a high frequency (approximately 2.5 KHz. in one embodiment) self-oscillating push-pull ozone generating cell.

In the preferred embodiment, the ozone generator is driven via a transformer. Since the ozone generator performs substantially as a capacitor, the transformer/ozone circuit has a natural resonant frequency. The oscillation of the circuit at its natural resonant frequency is referred to as "ringing". Each "ring" is a cycle of the resonant frequency.

In this context, the "ringing circuits" is a circuit which has a capacitance in parallel with an inductance, is damped, and is supplied with a step or pulse.

Although this application speaks in terms of a corona discharge ozone generator, all ozone generators are included including flat-plate, pyrex glass tube, and others well known to those of ordinary skill in the art.

The ozone cell's self resonant frequency is determined by the construction of the ozone cell and by the characteristics of the gas (air or oxygen) being put through the cell. In this invention, it has been found that the ozone production of the cell is optimized when the cell is at $2/3$ times the resonant frequency. The present invention detects the resonant frequency of the cell and drives the cell at approximately two-thirds times that resonant frequency.

To this end, a sensing circuit is connected to the primary coils of the high voltage transformer. The current drain to the transformer primary reflects the current flow through the transformer secondary/ozone cell. By monitoring the voltage through the sensing circuit, the proper timing of the switching of the electrical flow within the transformer/ozone cell circuit is obtained. This switching of flow is accomplished when the flow is substantially zero and preferably after one and a half (1.5) rings within the transformer/ozone cell.

By switching at substantially zero, energy loss due to heat is significantly reduced and stress upon the circuit is minimized.

By monitoring the "rings", the invention detects any changes in the resonant frequency during operation of the cell and adjusts the drive to the cell to compensate for those changes, thus driving the cell at the optimum frequency for maximal ozone production.

The present invention, in this manner, automatically adjusts for changes in: altitude, humidity in the carrier gas, applied voltages, carrier gas total flow rate, cell back pressure, density of carrier gas, operating temperature, cell characteristics (i.e. patina build-up on dielectrics), and secondary transformer. Further, after repair of an instrument, the self-adjusting circuit eliminates the need for adjustment or tuning of the instrument.

The self-adjusting circuit as described above is implemented only after voltage across the primary windings of the transformer has reached a preselected level. Before then, a start-up circuit is used to drive the transformer/ozone cell at pre-selected frequency which is just below the lower limit of the expected resonant frequency of the transformer/ozone cell circuit. The fixed frequency circuit provides a fall back mode of operation for most failure modes, thereby protecting the cell and drive circuits from overload.

In this manner, the assembly operates initially at a preselected frequency and then switches over to a self-compensating mode to optimize the production of ozone.

The invention and various embodiments thereof will be more fully explained by the accompanying drawings and tables together with the following description.

BRIEF DESCRIPTION OF THE DRAWINGS

FIG. 3 is a component table for the embodiment illustrated in FIGS. 2A, 2B, 2C, and 2D.

DETAILED DESCRIPTION OF THE INVENTION

Figure 1:
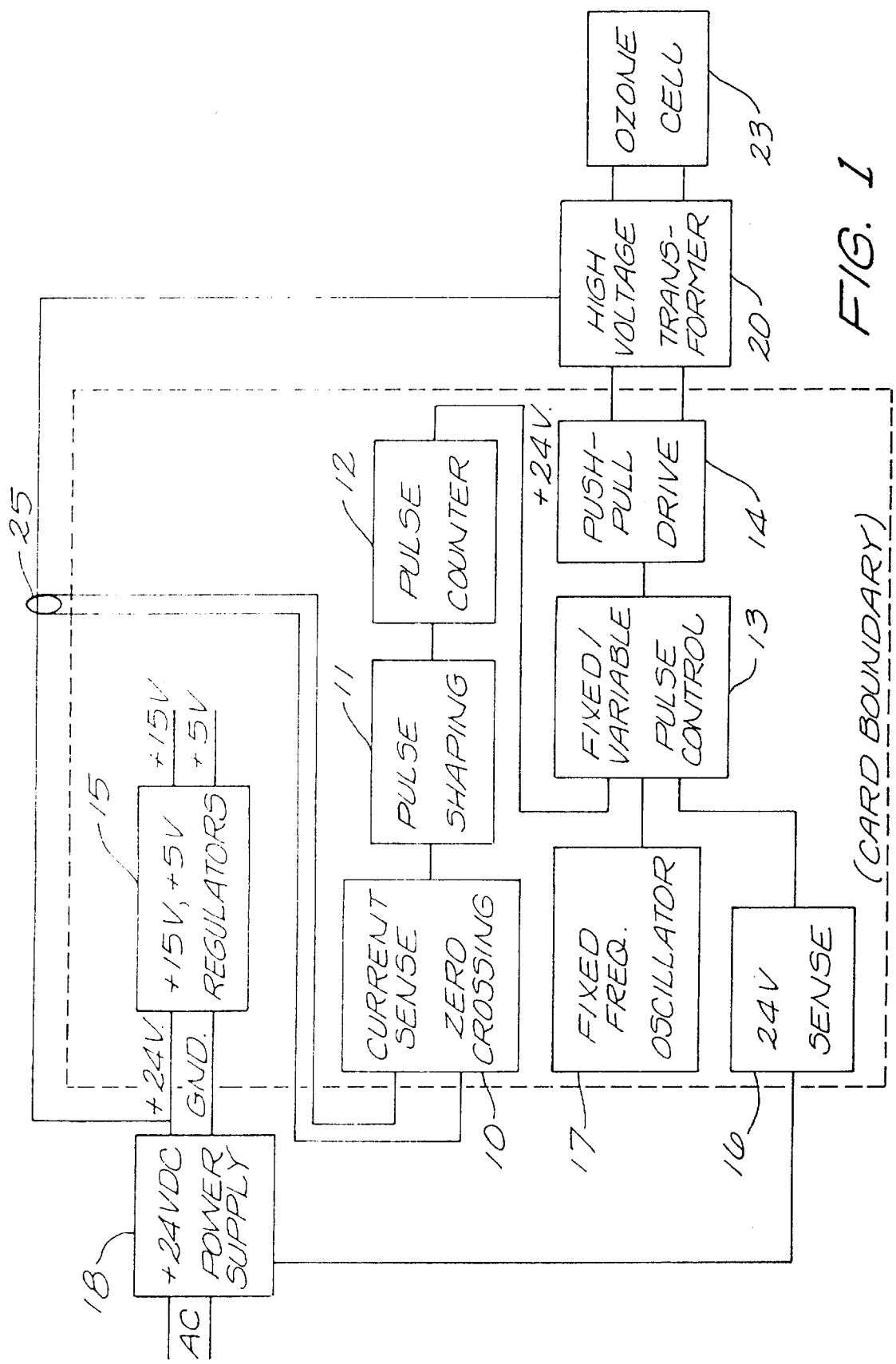
FIG. 1 is a block diagram of the preferred Self-Adjusting Push-Pull circuit that drives the ozone producing cell.
Figure 2A:
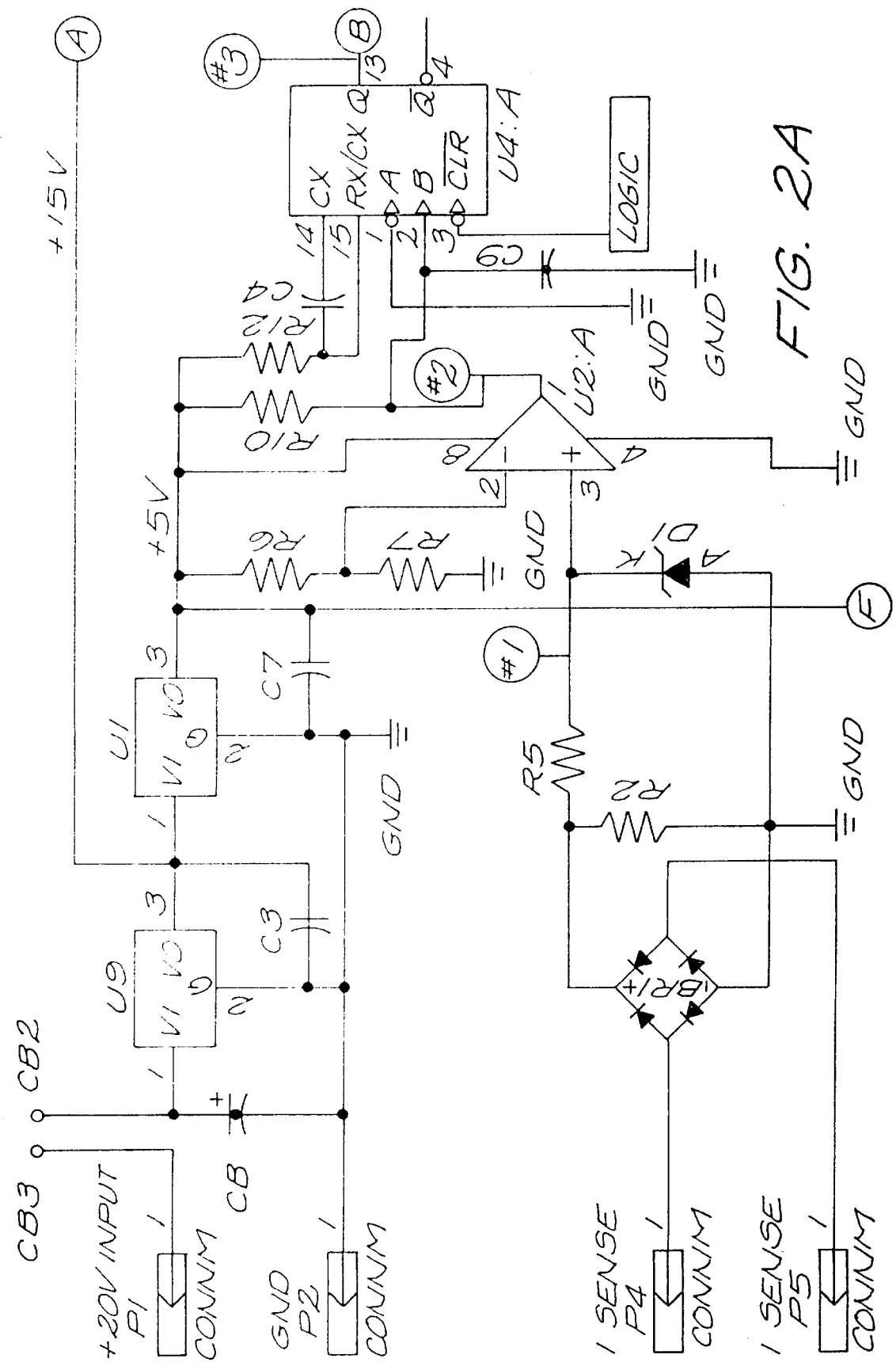
FIGS. 2A, 2B, 2C, 2D, and 2E are interlocking schematics of the circuit for preferred embodiment of the invention.
Figure 2B:
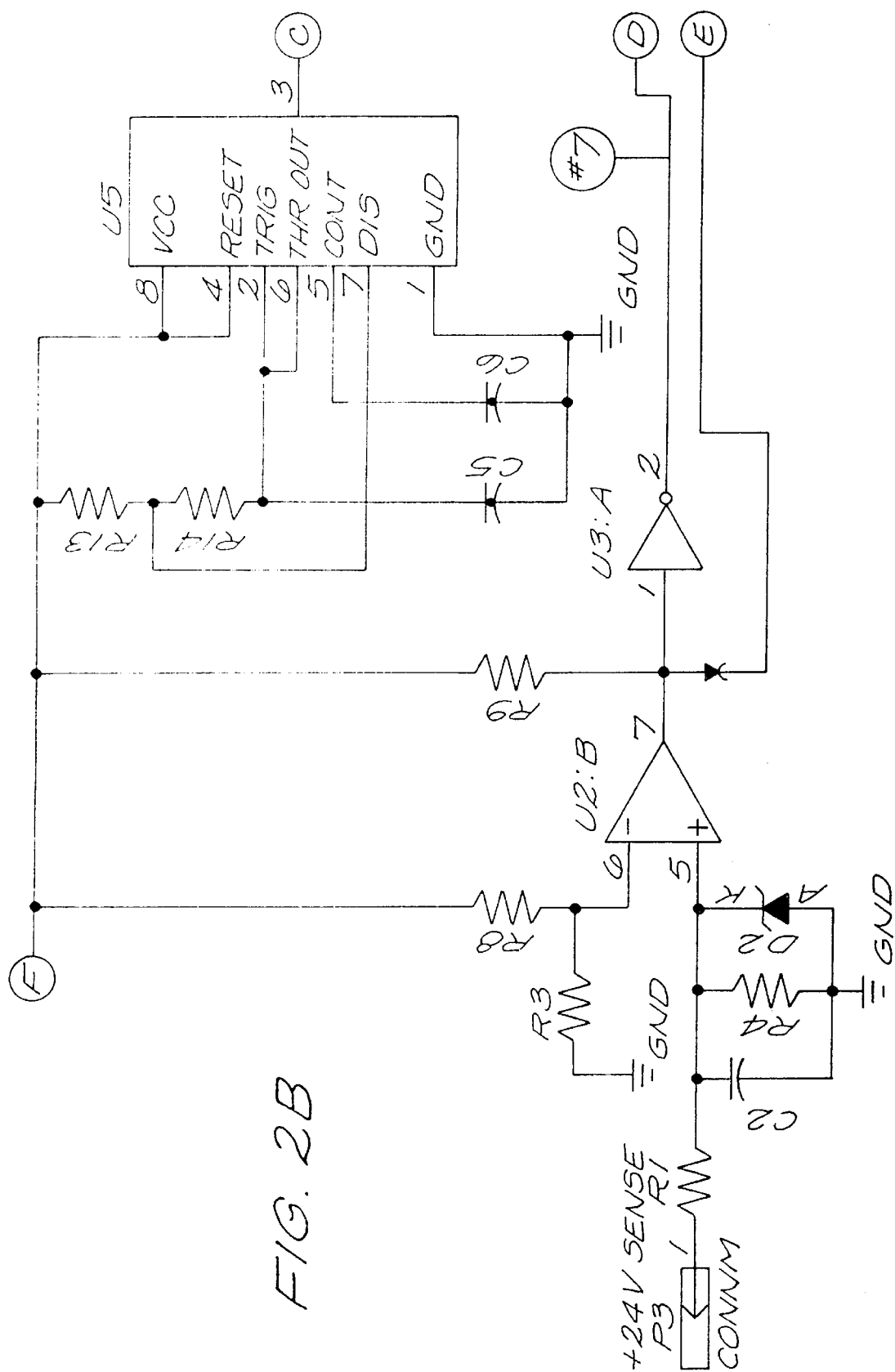
Figure 2C:
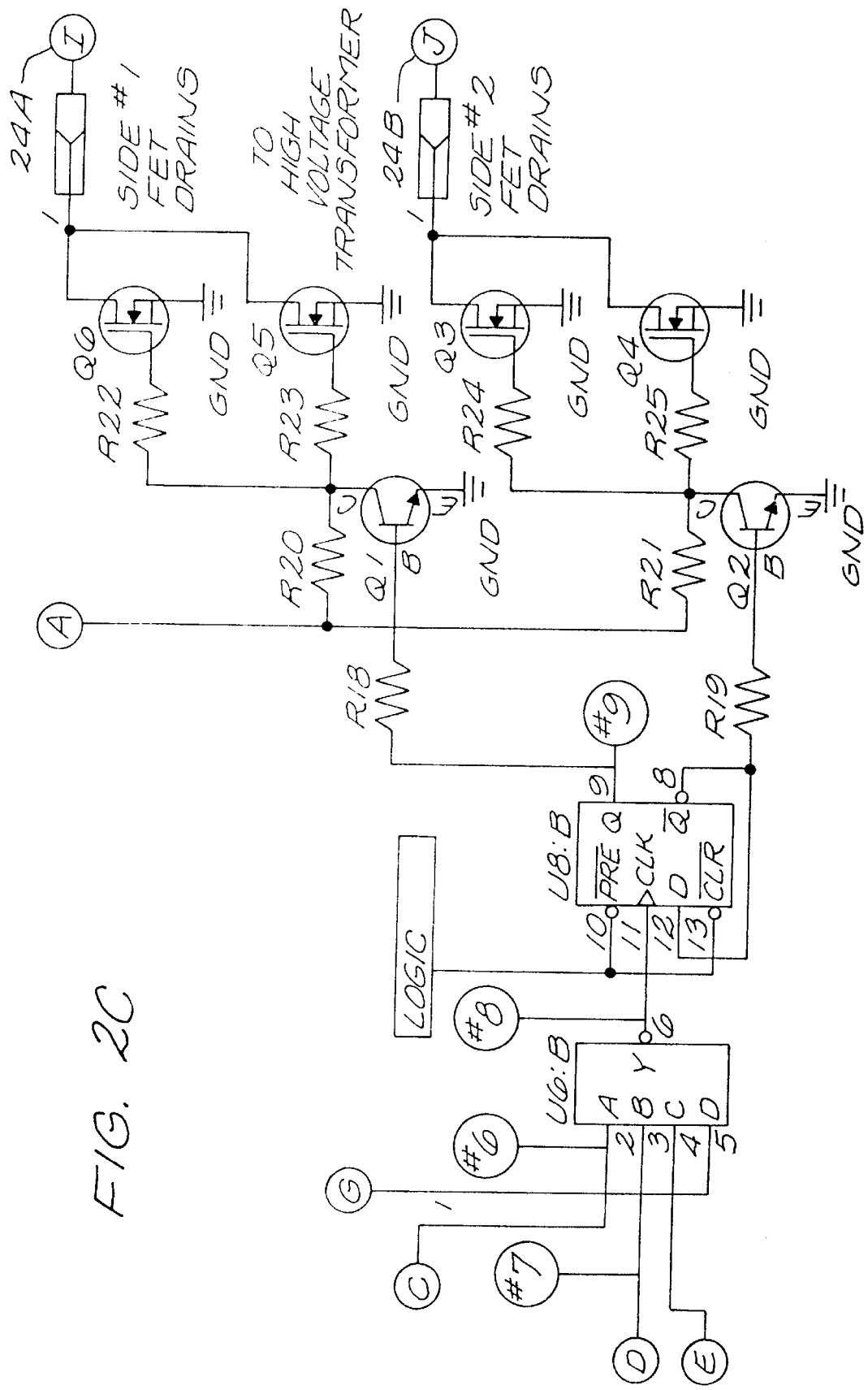
Figure 2D:
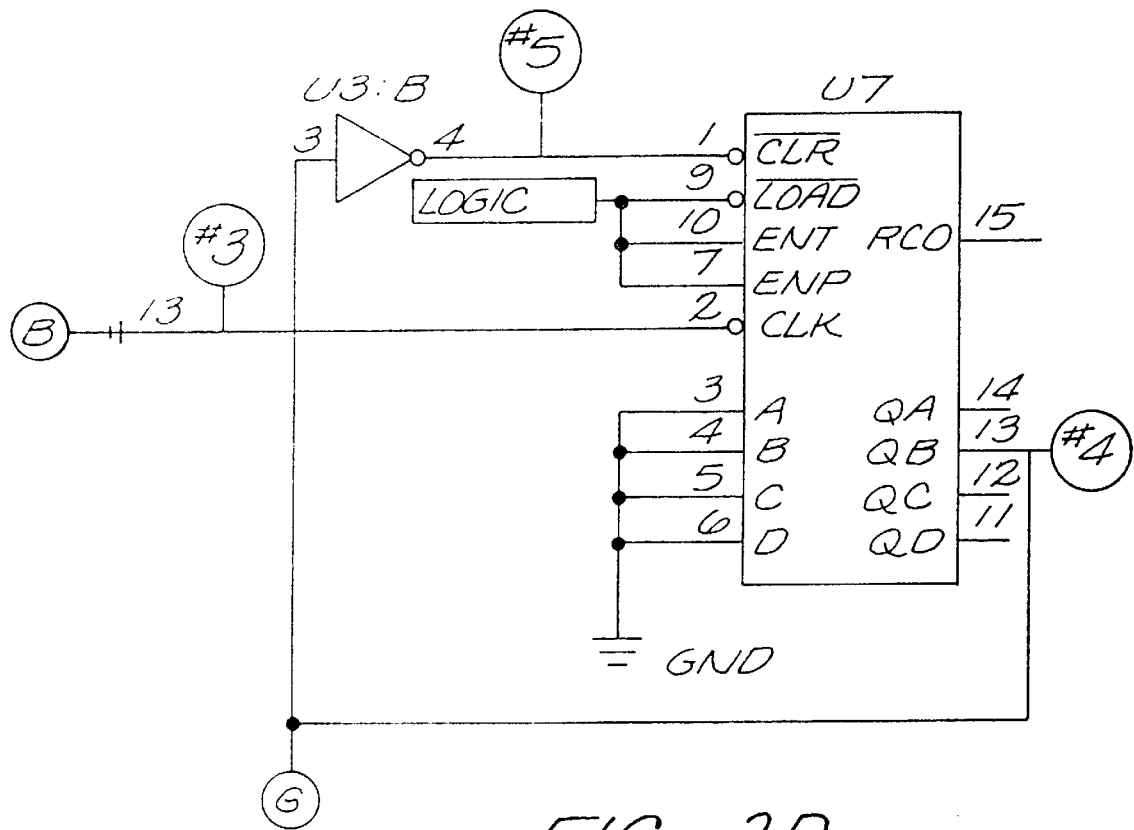
Figure 2E:
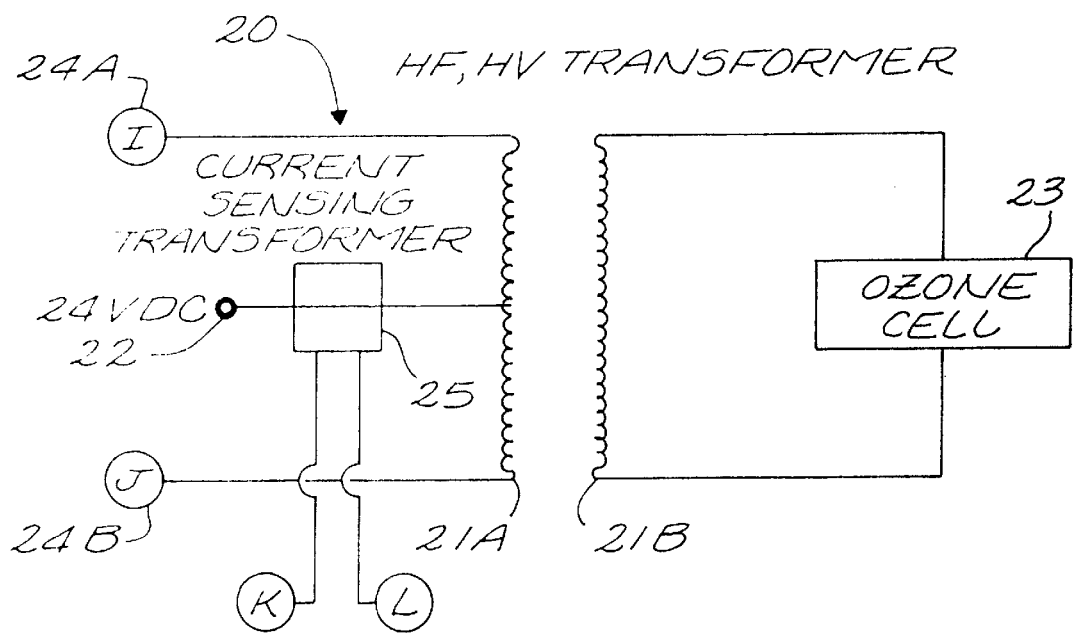

FIG. 1 is a block diagram of the preferred Self-Adjusting Push-Pull circuit that drives the ozone producing cell.

In the preferred embodiment of the invention, the system drives a high frequency ozone producing cell at ⅔ times its self resonant frequency which causes the cell to generate a maximum amount of ozone. When the cell is in operation the electrical current in the cell is a high frequency damped sinusoidal wave that is allowed to ring at ⅔ times the resonant frequency of the cell, which translates to a current wave that goes through zero three times. At the end of this time the cell is driven in the opposite direction.

The Current Sense Zero Crossing 10 monitors the cell current and generates a pulse every time the cell's current goes through zero.

Pulses from Current Sense Zero Crossing 10 are sent into a circuit 11 that shapes the signal into a logic level square wave and blocks out any noise pulses generated by the Current Sense Zero Crossing 10 circuit. When Pulse Counter 12 has seen three pulses as its input, Pulse Counter 12 sends out a pulse to the Fixed/Variable Pulse Control 13 which drives the Push-Pull Drive circuit 14 with either a fixed frequency (usually just below the self resonant frequency), or a variable frequency tied to the self resonant frequency of the transformer/ozone cell.

Push-pull drive 14 drives high voltage transformer 20 and subsequently ozone cell 23.

The 24 V supply 18 is used in the ozone cell for generating the high voltage needed for the arc. The 24 V sense circuit 16 senses the internal 24 V supply 18 and sends out a signal to the Fixed/Variable Pulse Control circuit 13 when the 24 V supply 18 is up to its normal operating voltage. Operational power is supplied by regulator 15.

The Fixed Frequency Oscillator 17 drives the Fixed/Variable Pulse Control 13 during the start up mode of the machine. Once the internal voltage of the ozone machine is up to operating voltage, the Fixed/Variable Pulse Control 13, switches the operation of the circuit into the variable frequency mode, which is the self-adjusting push-pull mode. The circuit then drives the cell at its optimum operating point. If the 24 V supply drops low, the circuit returns to fixed frequency operation.

FIGS. 2A, 2B, 2C, 2D, and 2E are interlocking schematics of the circuit for the preferred embodiment of the invention.

This circuit provides both a fixed frequency oscillator for initial driving of the primary windings 21A of transformer 20. This alternate drive is done as a push-pull arrangement in which the electrical flow is first from source 22 to lead 24A and then to lead 24B. The alternating flow induces a similar alternating flow in secondary windings 21B and similarly through ozone cell 23.

Using current sensing transformer 25, the current flowing through the primary windings 21A are monitored. Those of ordinary skill in the art readily recognize various implementations that will perform as the current sensing transformer 25.

This current flow from the power source 22 to the primary windings 21A, is directly related to the voltage which is experienced in the transformer 20/ ozone cell 23. By allowing the voltage within the transformer 20/ozone cell 23 to ring one and half (1.5) times before reversing the energy flow through transformer 20, the efficiency of ozone cell 23 is optimized.

In an alterative embodiment, multiple rings are achieved before reversal of the electrical flow.

Further, Current Sensing Transformer 25 is able to determine when the electrical flow within the transformer 20/ozone cell 23 circuit is substantially zero and to effectuate the reversal of electrical flow through transformer 20 when the electrical flow is substantially zero. This reduces energy loss but also assures that the circuit is properly monitoring changes in the resonant frequency of the transformer/ozone cell circuit; as the frequency changes, the circuit follows step with that frequency.

Although FIGS. 2A, 2B, 2C, 2D, and 2E illustrate the preferred embodiment of the invention, those of ordinary skill in the art readily recognize various other circuits which attain the objectives of the circuit illustrated in these figures.

FIG. 3 is a component table for the embodiment illustrated in FIGS. 2A, 2B, 2C, and 2D.

This table lists the components used in the construction of the preferred embodiment's circuit.

Figure 4:
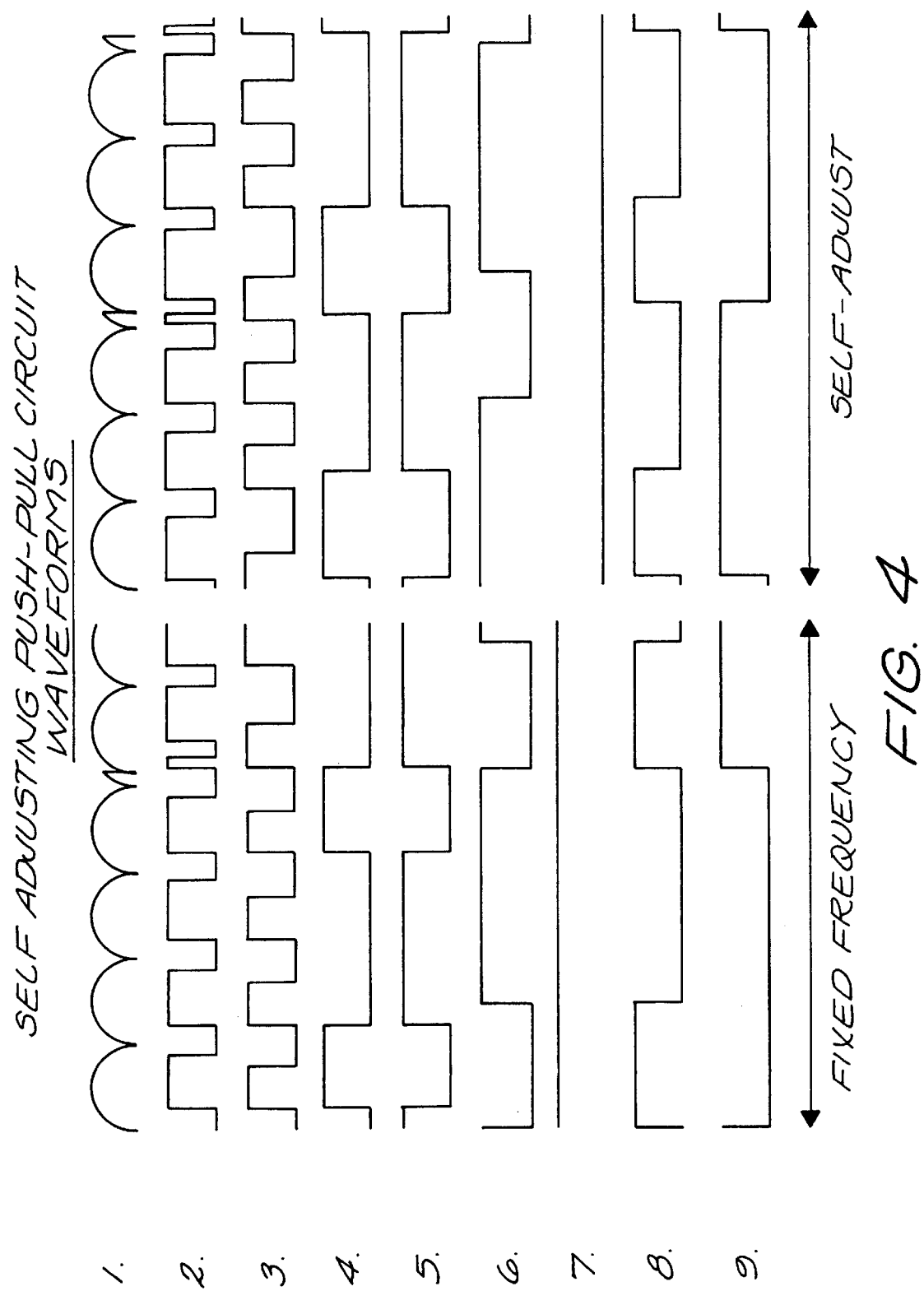
FIG. 4 is a timing diagram that shows waveforms produced at various places in the preferred embodiment's circuit.

FIG. 4 is a timing diagram that shows waveforms produced at various places in the preferred embodiment's circuit as illustrated in FIGS. 2A, 2B, 2C, 2D, and 2E. Within the following discussion, also note FIG. 1.

The Current Sense Zero Crossing circuit 10 is made of BR1, R2, R5, R6, R7, R10, D1, U2-A and C9. At location #1 to U2, the signal is a rectified clipped output from the current sense circuit. The output from the comparator goes to a low level when the input (See Item #1) drops below a present threshold. The output from the multivibrator has a minimum pulse width set nominally for 40 microseconds although other pulse widths are obvious to those of ordinary skill in the art. In the fixed frequency mode, there are up to five lobes seen at #2 and at the output of the Pulse Shaping circuit, #3. In the Self Adjusting mode of operation, there are three major lobes followed by one minor one at point #1. This is seen as three pulses at point #3 which is the output of the Pulse Shaping circuit made up of R12, C4, and U4.

The Pulse Counter 12 is made is made up of U3 and U7. The signal at point #4 has one pulse for every three seen at point #3. The absolute pulse duration in the Self-Adjust mode varies with changing conditions in the cell as caused by variations in voltage, air flow, temperature, humidity, etc.

The Fixed Frequency Oscillator 17 is made up of R13, R14, C5, C6, and U5. Output, at point #6, is feed into the Fixed/Variable Pulse Control 13 made up of U3-A, and U6-B.

The 24 V Sense circuit 16 is made up of R1, C2, R3, R4, D2, U2-B, R8, and R9. Its output is inverted and is seen at point #7 as an input to the Fixed/Variable Pulse Control circuit 13.

The input to the Fixed/Variable Pulse Control 13 is from the +24 V sense circuit 16. When this input is high, the Fixed/Variable Pulse Control 13 passes the timing pulses from the Fixed Frequency Oscillator 17. When the input is low, the Fixed/Variable Pulse Control 13 passes the timing pulses from the Self-Adjusting portion of the circuit (See #4) as the output of the Fixed/Variable Pulse Control 13.

The output of the Fixed/Variable Pulse Control circuit 13 is illustrated by the signal at point #8, which is the input to the Push-Pull Drive 14 made up of U8-B, R18, R19, R20, R21, R22, R23, R24, R25, Q3, Q4, Q5, and Q6.

The output of the Push-Pull Drive 14 goes to the high voltage high frequency (HF,HV) transformer 20 which feeds ozone cell 23 within the ozone generator. The pulse width varies when in the Self Adjust mode, but is stable in the fixed frequency mode.

It is clear from the foregoing that the present invention creates a vastly improved control circuit and ozone generator.

What is claimed is:

1. An electronic circuit comprising a self-adjusting circuit that senses a self-resonant current in an ozone generator having a natural frequency and drives the ozone generator at substantially two thirds of the natural frequency.

2. The electronic circuit according to claim 1 further including:
   a) a transformer having a primary and a secondary windings, said secondary windings being connected to said ozone generator;
   b) a start-up circuit for driving said ozone generator at a set frequency; and,
   c) means for engaging, with the primary windings of said transformer,
      1) said start-up circuit until voltage in said primary windings of said transformer reach a pre-selected level, and,
      2) said self-adjusting circuit once voltage in said primary winding of said transformer exceeds the pre-selected level.

3. The electronic circuit according to claim 2 wherein said self-adjusting circuit further includes:
   a) means for sensing substantially zero current flow to said ozone generator; and,
   b) means for switching current flow direction to said primary windings of said transformer at the selected multiple of said natural frequency and when said current flow to said ozone generator is substantially zero.

4. An ozone generating assembly comprising:
   a) an ozone generator having a natural frequency;
   b) a transformer having a primary and a secondary windings, said secondary windings being connected to said ozone generator;
   c) a drive circuit having,
      1) a start-up circuit for driving said ozone generator at a set frequency,
      2) a self-adjusting circuit that senses a self-resonant current in the ozone generator and drives the ozone generator at substantially two thirds of the natural frequency, and,
      3) means for engaging, with the primary windings of said transformer,
         A) said start-up circuit until voltage in said primary windings of said transformer reach a pre-selected level, and,
         B) said self-adjusting circuit once voltage in said primary winding of said transformer exceeds the preselected level.

5. The ozone generating assembly according to claim 4 wherein said self-adjusting circuit further includes:
   a) means for sensing substantially zero current flow to said ozone generator; and,
   b) means for switching current flow direction to said primary windings of said transformer at the selected multiple of said natural frequency and when said current flow to said ozone generator is substantially zero.

6. An ozone generating system comprising:
   a) an ozone generator having a first lead and a second lead;
   b) a transformer having a primary and secondary winding, said secondary winding being connected to said first and second lead of said ozone generator; and,
   c) a push-pull driving circuit connected to said primary winding and generating a signal such that said ozone generator receives an electrical signal having at least one and half voltage rings prior to changing direction of electrical flow in said first and second lead.

7. The ozone generating system according to claim 6 further including :
   a) a start-up circuit for driving said ozone generator at a set frequency; and,
   b) means for engaging, with the primary windings of said transformer,
      1) said start-up circuit until voltage in said primary windings of said transformer reach a pre-selected level, and,
      2) said self-adjusting circuit once voltage in said primary winding of said transformer exceeds a preselected level.

8. The ozone generating system according to claim 7 wherein said push-pull circuit further includes:
   a) means for sensing substantially zero current flow to said ozone generator; and,
   b) means for switching current flow to said primary windings of said transformer at the selected multiple of said natural frequency and when said current flow to said ozone generator is substantially zero.

9. A push-pull circuit for an ozone generator which causes an ozone generator to ring at least one and half times as natural self-resonant frequency of the ozone generator prior to reversing current flow in said ozone generator.

10. The push-pull circuit according to claim 9 wherein said circuit further includes:
   a) means for sensing substantially zero current flow to said ozone generator; and,
   b) means for switching current flow to said primary windings of said transformer at a selected multiple of said natural frequency and when said current flow to said ozone generator is substantially zero.

* * * * *